United States Patent
Inoue et al.

(10) Patent No.: US 7,177,540 B2
(45) Date of Patent: Feb. 13, 2007

(54) METHOD FOR UPGRADING AN OPTICAL TRANSMISSION SYSTEM AND AN OPTICAL TRANSMITTER

(75) Inventors: Takanori Inoue, Tokyo (JP); Hidenori Taga, Tokyo (JP); Koji Goto, Tokyo (JP)

(73) Assignees: KDDI Submarine Cable Systems Inc., Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 129 days.

(21) Appl. No.: 10/903,999

(22) Filed: Jul. 29, 2004

(65) Prior Publication Data

US 2005/0024715 A1   Feb. 3, 2005

(30) Foreign Application Priority Data

Jul. 30, 2003   (JP) ............................. 2003-282807

(51) Int. Cl.
*H04B 10/08* (2006.01)
*H01S 3/00* (2006.01)

(52) U.S. Cl. ........................................................ 398/16
(58) Field of Classification Search ................. 398/16; 359/337.1
See application file for complete search history.

(56) References Cited

U.S. PATENT DOCUMENTS

| | | | | |
|---|---|---|---|---|
| 6,721,507 | B2* | 4/2004 | Iwata et al. ................... | 398/79 |
| 6,738,184 | B2* | 5/2004 | Hayashi et al. ........... | 359/341.4 |
| 6,868,200 | B2* | 3/2005 | Kimotsuki et al. ........... | 385/24 |
| 6,907,195 | B2* | 6/2005 | Yu et al. ....................... | 398/5 |
| 6,944,399 | B2* | 9/2005 | Yu et al. ....................... | 398/5 |
| 2003/0090757 | A1* | 5/2003 | Ohtani ......................... | 359/111 |
| 2003/0113117 | A1 | 6/2003 | Taneda | |
| 2004/0247312 | A1* | 12/2004 | Hasuo et al. ................... | 398/5 |
| 2006/0051093 | A1* | 3/2006 | Manna ......................... | 398/79 |

FOREIGN PATENT DOCUMENTS

| | | | |
|---|---|---|---|
| EP | 1213865 A1 | * | 6/2002 |
| JP | 2002-353939 | | 12/2002 |
| JP | 2002353939 A | * | 12/2002 |
| JP | 2003-169037 | | 6/2003 |
| JP | 2005051596 A | * | 2/2005 |

OTHER PUBLICATIONS

Inoue et al. In-Service Upgrade Method for DWDM Submarine Cable System Using ASE Dummy Lights. OFCC 2004. Feb. 23-27, 2004. vol. 1.*
T. Inoue et al, "In-Service Upgrade Method for DWDM Submarine Cable System Using ASE Dummy Lights", Optical Fiber Communication Conference 2004, vol. 1, Feb. 23, 2004, 3 pages.
European Search Report, dated Aug. 1, 2005, for Application No. 04017886.5, in the name of KDDI Submarine Cable Systems Inc., et al.

* cited by examiner

*Primary Examiner*—Deandra M. Hughes
(74) *Attorney, Agent, or Firm*—Christie, Parker & Hale, LLP.

(57) ABSTRACT

A transmission wavelength band in an optical transmission line is divided into a plurality of sub-bands and signal lights or an ASE dummy light is disposed per sub-band as a unit. The optical power of the ASE dummy light in each sub-band is controlled so as to realize the gain profile at a full implementation in the optical transmission line. While new signal lights are being added, the optical power of whole ASE dummy lights or the optical power of the ASE dummy lights in sub-bands adjacent to the sub-band in which the new signal lights are to be added is controlled while increasing the optical power of the new signal lights so that the transmission characteristics of the existing signal lights are not affected by the signal addition.

10 Claims, 7 Drawing Sheets

METHOD FOR UPGRADING AN OPTICAL TRANSMISSION SYSTEM AND AN OPTICAL TRANSMITTER

CROSS REFERENCE TO RELATED APPLICATIONS

This application claims priority to Japanese Patent Application No. 2003-282807, filed Jul. 30, 2003, the entire contents of which are incorporated herein by reference.

FIELD OF THE INVENTION

This invention generally relates to a method for upgrading an optical transmission system and an optical transmitter, and more specifically relates to a method for upgrading a wavelength division multiplexing (WDM) optical transmission system and an optical transmitter for the method.

BACKGROUND OF THE INVENTION

In a typical WDM optical communication system, the optical transmission spectrum is divided into a few discrete signal wavelengths in order to save initial implementing costs. However, optical repeaters are typically implemented in an optical transmission line according to a specification designed for full implementation. When only discrete signal wavelengths are input into an optical transmission line designed for obtaining optimum input/output characteristics at full implementation, signal lights of respective signal wavelengths deteriorate due to nonlinear effects in the optical transmission line. The desired transmission characteristics, therefore, cannot be realized.

As a method for upgrading an optical transmission system in-service, a configuration has been proposed that introduces continuous wave (CW) dummy laser lights in addition to signal wavelengths. See Japanese Laid-Open Patent application No. 2003-169037 and its U.S. counterpart of United States Published Patent application No. 2003/0113117. In this conventional configuration, a plurality of CW dummy laser lights are introduced per predetermined number of the signal wavelengths beforehand to substitute the signal wavelengths and as the number of the signal wavelengths increases the power and number of the CW dummy laser lights are reduced.

As described in the above references, in such a configuration that one CW dummy laser light having a narrow spectral line-width substitutes a plurality of signal wavelengths, it is practically impossible to reproduce the gain profile in the full implementation. As a result, when new signal wavelengths are added, the gain profile in an optical transmission line greatly fluctuates and the channel power and receiving signal to noise ratio (SNR) of existing signal wavelengths severely fluctuate. The signal transmission becomes unstable immediately after the addition of the signal wavelengths, and close adjustments in the signal transmission are required.

Since one CW dummy laser light is assigned per several signal wavelengths, the optical power of the CW dummy laser light becomes very large. Consequently, the nonlinearity in the optical transmission line caused by the CW dummy laser light affects the signal lights in a non-negligible manner. In addition, since a CW laser light is used as the dummy light, its polarization affects the transmission characteristics of the signal lights.

To enable in-service upgrading, it is necessary to control the fluctuation of the gain profile, the fluctuation of the channel power of the existing signals, and the fluctuation of the receiving SNR while additive signals are being inserted.

SUMMARY OF THE INVENTION

One embodiment of the invention is a method for upgrading a wavelength division multiplexing optical transmission system. First, a transmission wavelength band in an optical transmission line designed for wavelength-division-multiplexing is divided into a plurality of sub-bands. Signal lights or an amplified spontaneous emission ("ASE") dummy light is disposed per sub-band to function as a transmission unit. By increasing the optical power of new signal lights in a first sub-band to which no ASE dummy light is disposed, the new signal lights are added. While the new signal lights are being added, the optical power of the ASE dummy light in the first sub-band is controlled so that the transmission characteristics such as the gain profile or receiving SNR of the existing signal lights can be maintained approximately to a fixed level.

Preferably, second new signal lights are added in a second sub-band to which an ASE dummy light is disposed by increasing the optical power of the second new signal lights in the second sub-band while decreasing the optical power of the ASE dummy light in the second sub-band. While the second new signal lights are being added, the optical power of the other ASE dummy lights is controlled so that the transmission characteristics of the existing signal lights and new signal lights can be maintained approximately to a fixed level.

An upgrading method according to the invention is a method for upgrading a wavelength division multiplexing system. First, a transmission wavelength band in an optical transmission line designed for wavelength-division-multiplexing is divided into a plurality of sub-bands. Making the sub-band as a transmission unit, signal lights or an ASE dummy light is disposed per sub-band. New signal lights are added in a sub-band to which an ASE dummy light is disposed by increasing the optical power of the new signal lights in the sub-band while decreasing the optical power of the ASE dummy light in the sub-band. While the new signal lights are being added, the optical power of the other ASE dummy lights is controlled so that the transmission characteristics of the existing signal lights can be maintained approximately to a fixed level.

An optical transmitter according to the invention is an apparatus to output signal lights into an optical transmission line designed for wavelength-division-multiplexing and comprises one or more signal light generating units to generate signal lights per sub-band as a unit, the sub-band being obtained by dividing a transmission wavelength band in the optical transmission line into a plurality of sub-bands, an ASE dummy light generating unit to generate one or more ASE dummy lights corresponding to one or more predetermined sub-bands in the plurality of sub-bands, an optical coupler having the same number of input ports with the number of the plurality of sub-bands to couple the output lights from the one or more signal light generating units and the output light from the ASE dummy light generating unit, and an extension signal light generating unit to generate signal lights for a sub-band to which no signal lights are assigned.

In the invention, after the transmission wavelength band in the optical transmission line is divided into the plurality of sub-bands, the signal lights or ASE dummy light is disposed per sub-band as a unit and new signal lights are added per sub-band. Accordingly, new signal lights can be extended in-service.

That is, when the signal wavelengths are added, the insertion of signal lights and the power control of the ASE dummy light in the adjacent sub-bands are performed per sub-band. This operation hardly affects the existing signal channels and accordingly it is possible to control the fluctuations of the optical power and receiving SNR of the existing signal channels. Consequently, the new signal wavelengths can be added in-service and furthermore the actual operation becomes easier.

Since the ASE dummy light is used, it is possible to obtain the gain profile close to the one expected in the design stage of the optical transmission line, namely the one obtained in the full-implementation, with fewer light sources. By assigning ASE dummy lights instead of signal wavelengths that are not used yet, nonlinear penalties of signal wavelengths can be reduced. Because of those merits, even though fewer signal wavelengths are used compared to the designed number of signal wavelengths, it is likely to realize satisfactory transmission characteristics as planned in the design specification.

BRIEF DESCRIPTION OF THE DRAWINGS

The above and other objects, features and advantages of the present invention will be apparent from the following detailed description of exemplary embodiments of the invention in conjunction with the accompanying drawings, in which.

DETAILED DESCRIPTION

Exemplary embodiments of the invention are explained below in detail with reference to the drawings. In one embodiment, a transmission wavelength band in an optical transmission line at a full-implementing state, i.e. a transmission wavelength band in the design specification, is divided into a plurality of sub-bands having a specific wavelength width and signal lights or ASE dummy light are disposed per sub-band.

Figure 1:
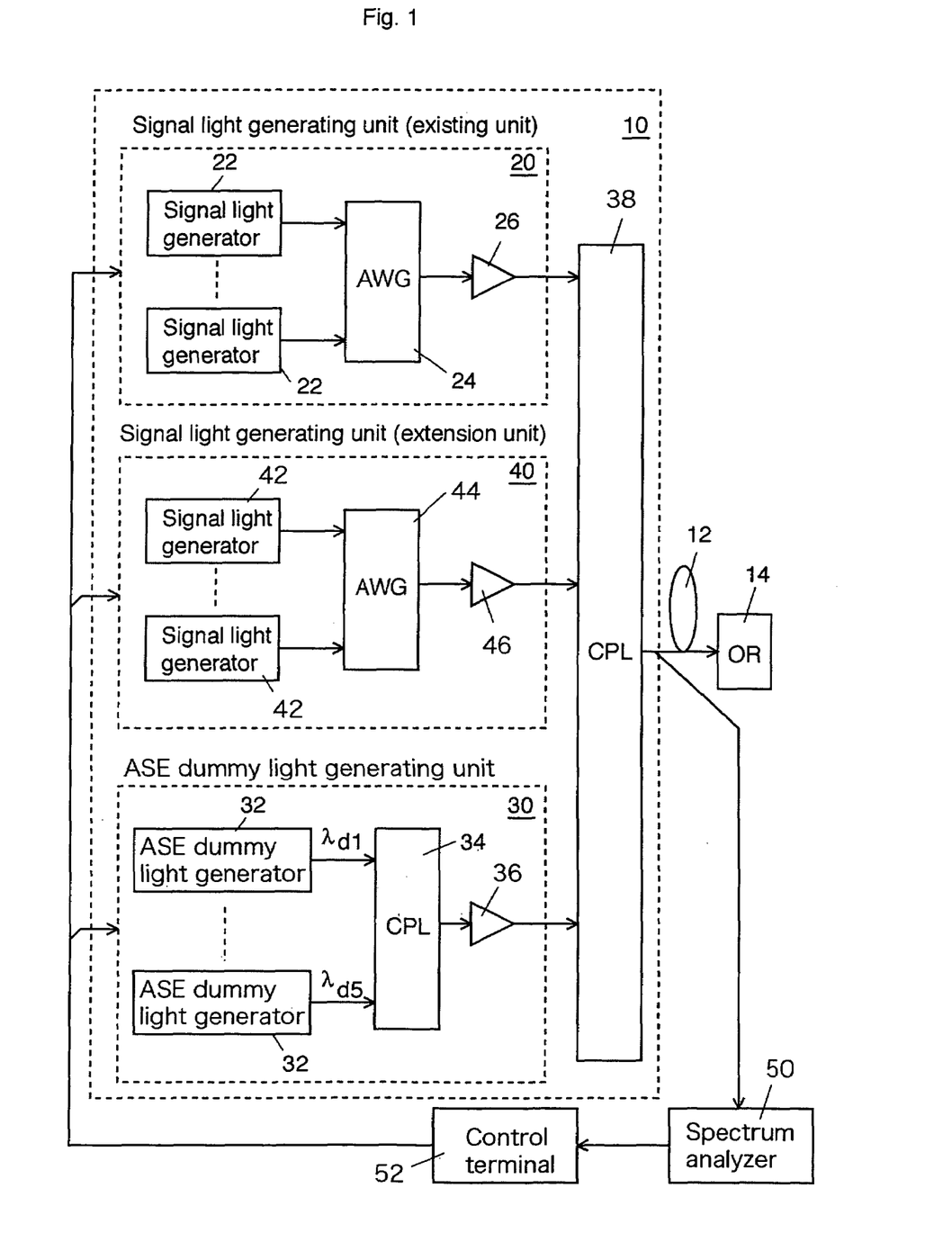
FIG. 1 is a schematic block diagram of an exemplary embodiment of an optical transmission system according to the invention.
Figure 2:
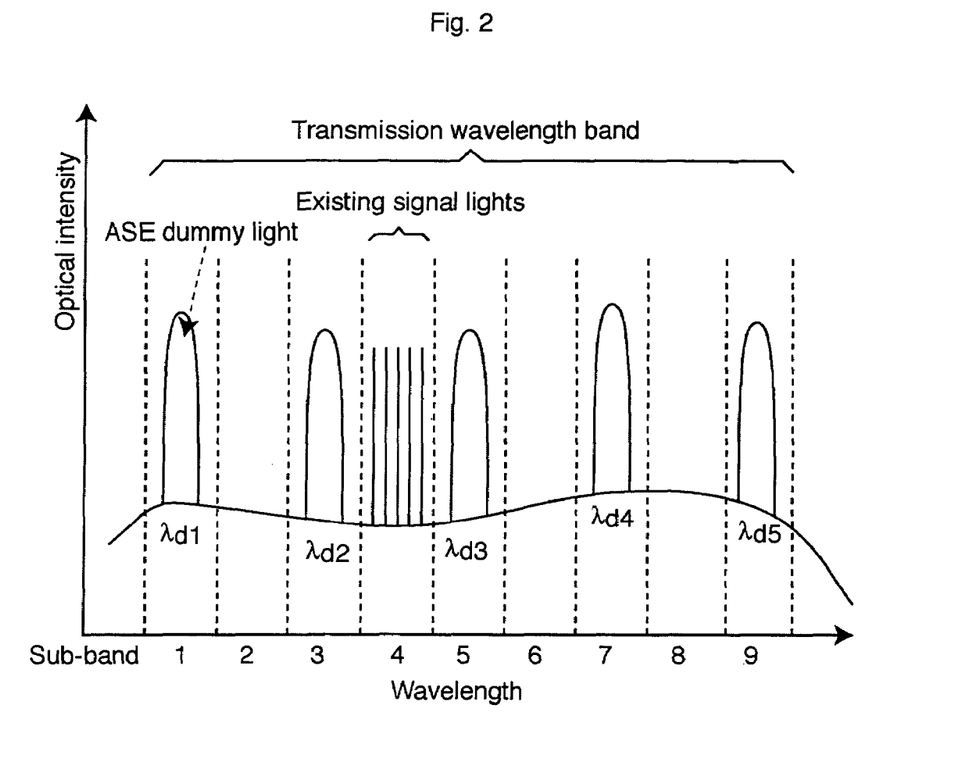
FIG. 2 is an example of a wavelength map before signal lights are added to the sub-band 6.
Figure 3:
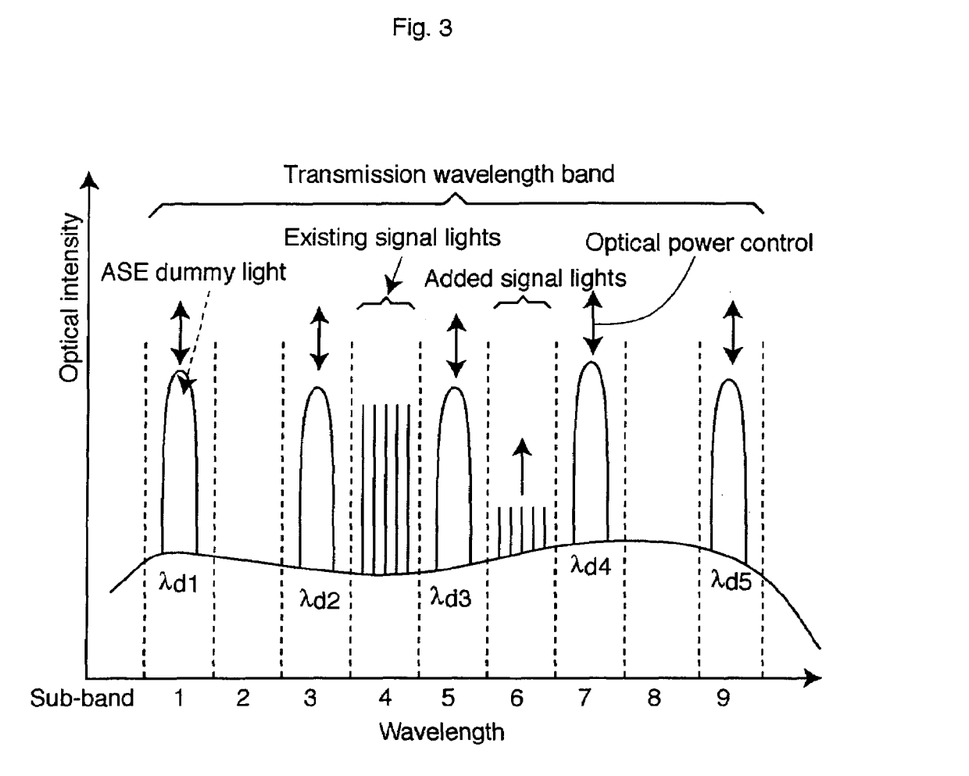
FIG. 3 is an example of a wavelength map while the signal lights are being added to the sub-band 6.
Figure 4:
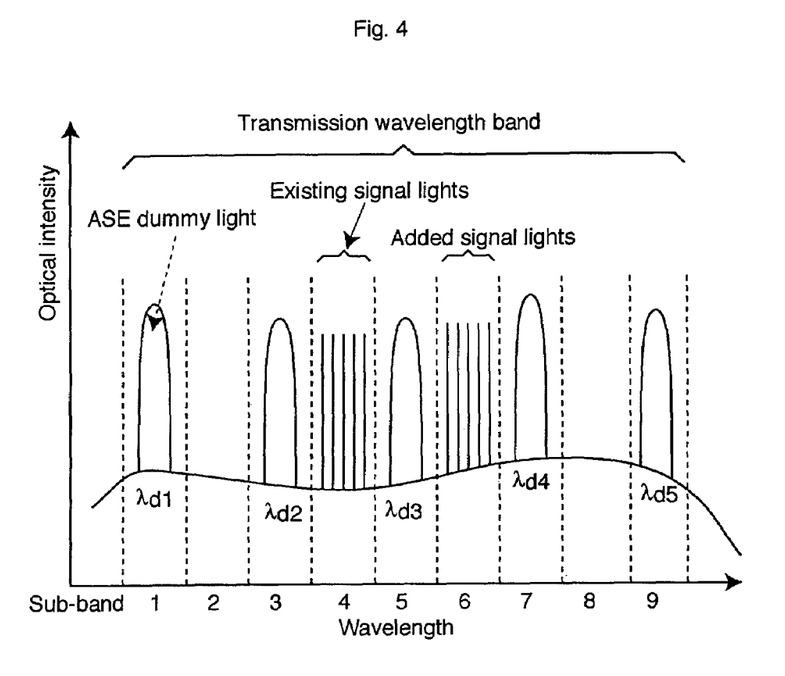
FIG. 4 is an example of a wavelength map after the signal lights have been added to the sub-band 6.

FIG. 1 shows a schematic block diagram of a WDM transmission system upgraded by an exemplary embodiment according to the invention, FIG. 2 shows an example of a wavelength map before the upgrading, FIG. 3 shows an example of a wavelength map during the upgrading, and FIG. 4 shows an example of a wavelength map after the upgrading. In FIGS. 2, 3, and 4, the horizontal axis expresses sub-bands and the vertical axis expresses optical intensity.

An optical transmitter 10 outputs a plurality of signal lights and a plurality of ASE dummy lights, each having a different wavelength as shown in FIG. 2, into an optical transmission line 12. The signal lights and ASE dummy lights propagated in the optical transmission line 12 enter an optical receiver 14. The optical receiver 14 receives and processes the signal lights. In the example shown in FIG. 2, the transmission wavelength band in the optical transmission line 12 is divided into nine sub-bands and an ASE dummy light is disposed to the odd numbered sub-bands of 1, 3, 5, 7, and 9 while signal lights are disposed to the sub-band 4.

At the beginning, only one sub-band is used for the signal transmission and, as a demand for the transmission becomes larger, the number of sub-bands used for the signal transmission is increased. When a sub-band to which an ASE dummy light is disposed is used for the signal transmission, the ASE dummy light is removed from the sub-band and new signal lights are inserted to the sub-band.

An exemplary upgrading method is explained below in which signal lights are added to the sub-band 6.

The optical transmitter 10, prior to upgrading, comprises a signal light generating unit (existing unit) 20 to generate a WDM signal light assigned to the sub-band 4 and an ASE dummy light generating unit 30 to generate ASE dummy lights assigned to the odd numbered sub-bands of 1, 3, 5, 7 and 9.

The existing unit 20 includes a plurality of signal light generators 22, each generating a signal light of a different wavelength in the sub-band 4, an arrayed waveguide grating (AWG) 24 as a multiplexer to multiplex output lights from the signal light generators 22, and an optical amplifier 26 to optically amplify an output light, namely WDM signal light, from the AWG 24.

The ASE dummy light generating unit 30 includes an ASE dummy light generator 32 to generate ASE dummy lights of dummy wavelengths $\lambda_{d1}$ to $\lambda_{d5}$, each wavelength being different from each other, an optical coupler 34 to couple the ASE dummy lights output from the ASE dummy light generators 32, and an optical amplifier 36 to optically amplify an output light from the optical coupler 34. The dummy wavelengths $\lambda_{d1}$ to $\lambda_{d5}$ correspond to the central wavelengths of sub-bands 1, 3, 5, 7, and 9 respectively.

A signal light generating unit (extension unit) 40 is added to use the sub-band 6 for the signal transmission. The configuration of the extension unit 40 is identical to the existing unit 20 except for the signal wavelengths. That is, the extension unit 40 comprises a plurality of signal light generators 42, each generating a signal light of a different wavelength in the sub-band 6, an arrayed waveguide grating (AWG) 44 as a multiplexer to multiplex output lights from the signal light generators 42, and an optical amplifier 46 to optically amplify an output light, i.e. WDM signal light, from the AWG 44.

Before updating, an optical coupler 38 couples the output light from the optical amplifier 26 in the existing unit 20 and the output light from the optical amplifier 36 in the ASE dummy light generating unit 30 and outputs the coupled lights into the optical transmission line 12. After the addition of the signal light generating unit 40, the optical coupler 38 couples the output light from the optical amplifier 26 in the existing unit 20, the output light from the optical amplifier 46 in the extension unit 40, and the output light from the optical amplifier 36 in the ASE dummy light generating unit 30 and outputs the coupled lights into the optical transmission line 12.

The optical coupler 38 includes input ports corresponding to the number of sub-bands (nine in the embodiment shown in FIG. 2) obtained by dividing the transmission wavelength band in the optical transmission line 12. When a multiplexer to multiplex signal lights in a plurality of sub-bands is provided separately, the number of input ports of the optical coupler 38 can be reduced by the number obtained by subtracting 1 from the multiplexed number. However, even in that case, the multiplexer is considered as a part of the optical coupler 38 and accordingly the required number of input ports becomes equivalent to the number of sub-bands.

Dispersion compensators may be appropriately disposed in the optical transmitter 10, optical transmission line 12, and optical receiver 14. In addition, a large number of optical repeaters can be disposed in the optical transmission line 12. However, since they are unrelated to the present invention, the explanation about those devices is omitted here.

In the upgrading shown in FIGS. 2, 3, and 4, no ASE dummy light is assigned to the sub-band 6 where signal lights are to be added. To prevent the deterioration of the transmission condition of the existing signal lights in the sub-band 4, it is necessary to maintain the gain profile in the optical transmission line 12, more specifically the gain profile in the sub-band 4 (existing signal lights), at a fixed level before and after the insertion of signal lights into the sub-band 6. A gain profile in an optical transmission line in a first case where only a small number of signal wavelengths are used with a gain profile in a second case where whole signal wavelengths are used. This is accomplished by equalizing the transmission characteristics, more specifically receiving SNR, of each signal wavelength in the first case with the transmission characteristics (or receiving SNR) in the second case. In this embodiment, the optical power of all ASE dummy lights or the optical power of the ASE dummy lights in the sub-bands 5 and 7 which are adjacent to the sub-band 6 is controlled while the optical power of the signal lights in the sub-band 6 is gradually increased.

As shown in FIG. 1, to perform the above control operation, a spectrum of an output light from the optical coupler 16, namely a spectrum of an input light of the optical transmission line 12, is measured by a spectrum analyzer 50. The spectrum analyzer 50 applies its measured content to a control terminal 52. The control terminal 52 displays the content measured by the spectrum analyzer 50 on the monitor screen. On the monitor screen, a spectral distribution shown in FIG. 3, for example, is displayed.

An operator controls the optical power of ASE dummy lights so that the average value of the peak level of existing signal lights is maintained value before the addition of signal lights, referring to the spectral distribution displayed on the monitor screen of the control terminal 52. When the optical power of all ASE dummy lights is increased/decreased in a lump, the gain of the optical amplifier 36 should be controlled. When the optical power of only specific ASE dummy light is increased/decreased, the output light power of the corresponding ASE dummy light generator 32 should be controlled.

The optical power of added signal lights is increased using the optical amplifier 46 in the extension unit 40 until it reaches a predetermined level while the optical power of ASE dummy lights is being controlled.

When the optical power of the added signal lights reaches the predetermined level, the upgrading is completed.

When signal lights are added to the other sub-band, for example to the sub-band 2 or 8, the power of all ASE dummy lights or the optical power of the ASE dummy lights in the adjacent sub-bands are controlled as described above.

In the embodiment shown in FIG. 1, although only the existing unit 20 relative to one sub-band is illustrated, it is also possible to use a plurality of sub-bands for signal transmission before upgrading. In that case, a signal light unit that corresponds to each sub-band and that comprises a similar configuration to the existing signal light generating unit 20 should be connected to the optical coupler 38.

Figure 5:
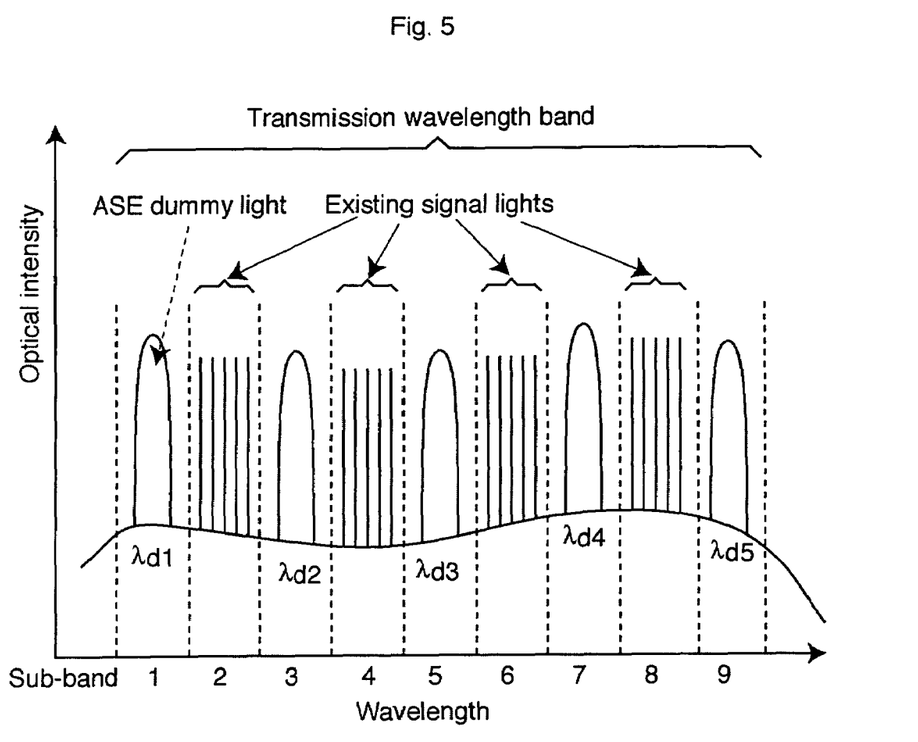
FIG. 5 is an example of a wavelength map before signal lights are added to the sub-band 5.
Figure 6:
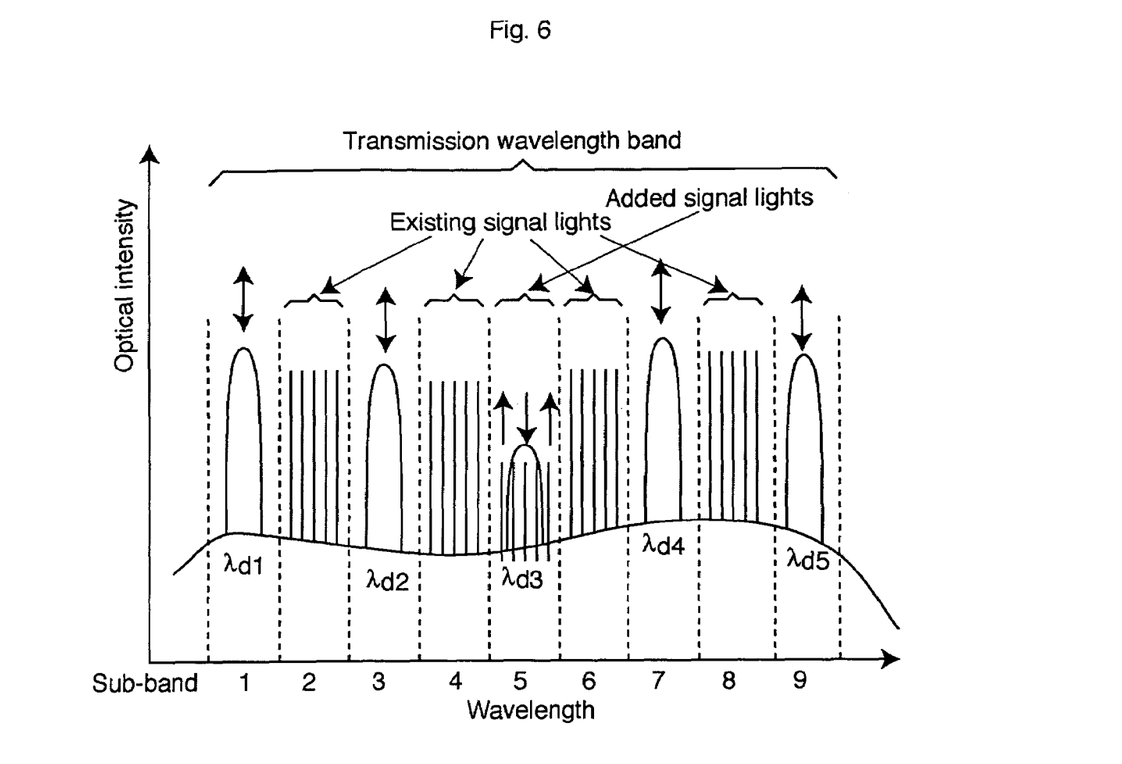
FIG. 6 is an example of a wavelength map while the signal lights are being added to the sub-band 5.
Figure 7:
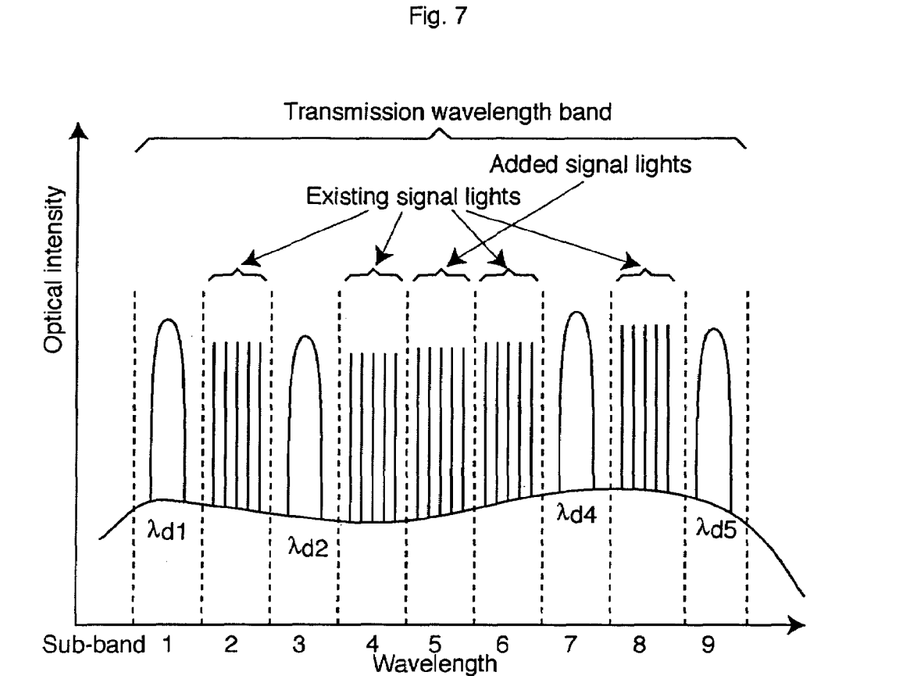
FIG. 7 is an example of a wavelength map after the signal lights have been added to the sub-band 5.

Next, an upgrading process is explained in the case that signal lights are added to a sub-band to which an ASE dummy light is disposed. As shown in FIG. 5, for example, signal lights are added to the sub-band 5 on the condition that signal lights are disposed in the even numbered sub-bands of 2, 4, 6, and 8 and ASE dummy lights are disposed in the odd numbered sub-bands of 1, 3, 5, 7, and 9. FIG. 5 shows an example of a wavelength map before the upgrading, FIG. 6 shows an example of wavelength map during the upgrading, and FIG. 7 shows an example of wavelength map after the upgrading. In FIGS. 5, 6, and 7, the horizontal axis expresses wavelength or sub-band and the vertical axis expresses optical intensity.

As shown in FIG. 5, output lights from four signal light generating units corresponding to the sub-bands of 2, 4, 6, and 8 respectively are connected to the optical coupler 38. A signal light generating unit corresponding to the sub-band 5 is provided as an extension unit and connected to the optical coupler 38 with its optical output in an OFF state.

An operator reduces the optical power of the ASE dummy lights in the sub-band 5 while increasing the signal light power in the sub-band 5. The operator controls the power of the ASE dummy lights in the sub-bands 1, 3, 7, and 9 so that the average value of the peak level of the existing signal lights in the sub-bands 2, 4, 6, and 8 maintain the value before the addition of signal lights. The operator refers to the spectral distribution displayed on the monitor screen of the control terminal 52. The increasing speed of the signal light power and the decreasing speed of the ASE dummy light power may be set in advance so that both control operations are engaged together to be executed automatically.

When it is desired to control the output power of a plurality of ASE dummy lights together at the same level, an optical coupler can couple the plurality of ASE dummy lights and an optical amplifier can be connected to the output of the optical coupler. In this configuration, by controlling the gain of the optical amplifier, the optical power of the plurality of ASE dummy lights can be controlled collectively.

While the invention has been described with reference to the specific embodiment, it will be apparent to those skilled in the art that various changes and modifications can be made to the specific embodiment without departing from the spirit and scope of the invention as defined in the claims.

The invention claimed is:

1. A method for upgrading a wavelength division multiplexing transmission system, comprising:
    dividing a transmission wavelength band in an optical transmission line designed for wavelength-division-multiplexing into a plurality of signal sub-bands;
    disposing existing signal lights in each sub-band of a first subset of the plurality of signal sub-bands and disposing an ASE dummy light in each sub-band of a second subset of the plurality of signal sub-bands, each of the plurality of sub-bands functioning as a transmission unit;
    adding new signal lights in a first sub-band to which no ASE dummy light is disposed by increasing the optical power of the new signal lights in the first sub-band; and
    controlling optical power of at least one ASE dummy light in a signal sub-band so that transmission characteristics of the existing signal lights are kept to a fixed level while the new signal lights are being added.

2. The method of claim 1 further comprising:
adding second new signal lights in a second sub-band to which an ASE dummy light is disposed by increasing the optical power of the second new signal lights in the second sub-band while decreasing the optical power of the ASE dummy light in the second sub-band; and
controlling the optical power of at least one ASE dummy light so that the transmission characteristics of the existing signal lights and the new signal lights are kept to a fixed level while the second new signal lights are being added.

3. An upgrading method for upgrading a wavelength division multiplexing transmission system, comprising:
dividing a transmission wavelength band in an optical transmission line designed for wavelength-division-multiplexing into a plurality of sub-bands;
disposing existing signal lights in each sub-band of a first subset of the plurality of sub-bands and disposing an ASE dummy light in each sub-band of a second subset of the plurality of sub-bands, each of the plurality of sub-bands functioning as a transmission unit;
adding new signal lights in a first sub-band to which an ASE dummy light is disposed by increasing the optical power of the new signal lights in the first sub-band while decreasing the optical power of the ASE Dummy light in the first sub-band; and
controlling the optical power of at least one ASE dummy light so that the transmission characteristics of the existing signal lights are kept to a fixed level while the stew signal lights are being added.

4. The method of claim 2, wherein the at least one ASE dummy light that is controlled is different from the ASE dummy light disposed to the second sub-band.

5. The method of claim 4, wherein the at least one ASE dummy light that is controlled is disposed to the second sub-band.

6. The method of claim 2 or claim 3, wherein the controlling is performed on the ASE dummy lights collectively.

7. The method of claim 3, wherein the at least one ASE dummy light that is controlled is different from the ASE dummy light disposed to the first sub-band.

8. The method of claim 7, wherein the at least one ASE dummy light that is controlled is assigned to a sub-band adjacent to the first sub-band.

9. The method of claim 1, wherein the first subset of the plurality of signal sub-bands and the second subset of the plurality of signal sub-bands are intermingled.

10. The method of claim 1, wherein the wavelengths of the ASE dummy lights in each sub-band of the second subset corresponds to a central wavelength of the each sub-band.

* * * * *